(12) United States Patent
Collins et al.

(10) Patent No.: US 11,316,154 B2
(45) Date of Patent: Apr. 26, 2022

(54) HIGH THROUGHPUT INSULATION OF 3D IN-SILICON HIGH VOLUMETRIC ENERGY AND POWER DENSE ENERGY STORAGE DEVICES

(71) Applicant: International Business Machines Corporation, Armonk, NY (US)

(72) Inventors: John Collins, Tarrytown, NY (US); John M. Papalia, New York, NY (US); David L. Rath, Stormville, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/702,151

(22) Filed: Dec. 3, 2019

(65) Prior Publication Data

US 2021/0167370 A1    Jun. 3, 2021

(51) Int. Cl.
| | |
|---|---|
| *H01M 4/66* | (2006.01) |
| *H01M 4/134* | (2010.01) |
| *H01M 4/1395* | (2010.01) |
| *H01M 4/133* | (2010.01) |
| *H01M 4/1393* | (2010.01) |
| *H01M 4/38* | (2006.01) |
| *H01M 10/0525* | (2010.01) |
| *H01M 10/058* | (2010.01) |

(52) U.S. Cl.
CPC ......... *H01M 4/386* (2013.01); *H01M 4/134* (2013.01); *H01M 4/1395* (2013.01); *H01M 4/382* (2013.01); *H01M 10/058* (2013.01); *H01M 10/0525* (2013.01)

(58) Field of Classification Search
None
See application file for complete search history.

(56) References Cited

U.S. PATENT DOCUMENTS

| | | |
|---|---|---|
| 6,087,042 A | 7/2000 | Sugiyama et al. |
| 6,495,283 B1 | 12/2002 | Yoon et al. |
| 8,637,186 B2 | 1/2014 | Kim et al. |

(Continued)

OTHER PUBLICATIONS

Pikul, J. H., et al., "High-Power lithium ion microbatteries from interdigitated three-dimensional bicontinous nanoporous electrodes", Nature Communications, Apr. 16, 2013, 5 pages.

(Continued)

*Primary Examiner* — Yoshitoshi Takeuchi
(74) *Attorney, Agent, or Firm* — Scully, Scott, Murphy & Presser, P.C.; Daniel P. Morris, Esq.

(57) ABSTRACT

A three dimensional (3D) In-Silicon energy storage device is provided by a method that includes forming a thick dielectric material layer on a surface of a silicon based substrate. A 3D trench is then formed into the dielectric material layer and the silicon based substrate, and thereafter a dielectric material spacer is formed, in addition to the dielectric remaining on the field of the substrate, as well as along a sidewall of the 3D trench, and on a first portion of a sub-surface of the silicon based substrate that is present at a bottom of the 3D trench. A second portion of the sub-surface of the silicon based substrate that is present in the 3D trench remains physically exposed. Active energy storage device materials can then be formed laterally adjacent to the dielectric material spacer that is within the 3D trench and on the dielectric material layer.

10 Claims, 4 Drawing Sheets

(56) References Cited

U.S. PATENT DOCUMENTS

| | | |
|---|---|---|
| 8,691,450 B1 | 4/2014 | Srinivasan et al. |
| 9,123,954 B2 | 9/2015 | Nathan |
| 9,190,478 B2 | 11/2015 | Calafut et al. |
| 9,614,256 B2 | 4/2017 | Karlovsky et al. |
| 9,761,901 B2 | 9/2017 | Rust, III et al. |
| 9,859,542 B2 | 1/2018 | Weis et al. |
| 2009/0026586 A1 | 1/2009 | Anderson |

OTHER PUBLICATIONS

Thakur, M., et al., "Freestanding Macroporous Silicon and Pyrolyzed Polyacrylonitrile as a Composite Anode for Lithium Ion Batteries", American Chemical Society, Jul. 6, 2012, pp. 2998-3003, vol. 24, No. 15.

U.S. Appl. No. 16/026,461, Title of Invention: Battery Structure With an Anode Structure Containing a Porous Region and Method of Operation, filed Jul. 3, 2018, First Named Inventor: Joel P. de Souza, 51 pages.

HIGH THROUGHPUT INSULATION OF 3D IN-SILICON HIGH VOLUMETRIC ENERGY AND POWER DENSE ENERGY STORAGE DEVICES

BACKGROUND

The present application relates to energy storage devices, and more particularly to three dimensional (3D) In-Silicon energy storage devices that have enhanced and consistent performance, partly enabled via a high throughput method of insulation patterning, and a method of forming the same.

The integration of energy storage devices, e.g., batteries, in microprocessors and memory chips is a significant requirement for Internet-of-Thing (IoT) applications. In addition to IoT applications, emerging applications requiring these on-board next generation energy storage devices include mobile devices, sensory equipment, and autonomous environmental, biological, and social functional machines. Common examples of such functional devices are smart dust, and/or biomedical sensory/drug-delivery devices and/or environmental sensory, computing and communication devices. Additionally, many solid-state energy devices will progressively integrate a lithium metal electrode material or a lithium-silicon based electrode material into its' overall cell structure due to lithium metal's extremely high theoretical species capacity of greater than about 3800 mAh/g.

Over the next generation, as human controlled and autonomous devices increasingly become miniaturized, total energy consumption requirements for electronic devices will decrease. Power consumption is expected to be lower than 1 Watt for these devices. However, because of device miniaturization, the energy storage devices providing device power will need to be miniaturized as well, sometimes be embedded in complementary metal oxide (CMOS) circuits, and will need high energy and power density.

Because of the pervasive use of miniaturized energy storage devices, e.g., batteries, there is a need for a silicon-containing energy storage device that both protects and is protected from the external environment. Storage device design features are needed to enable the efficient mass fabrication of the entire miniaturized energy storage device via 3D features.

Additionally, there is an increasingly demand for safe, well contained, all solid-state energy storage for microelectronic devices with the evolution of microelectronics in IoT, like in the health care industries. The demand for all solid-state higher gravimetric and areal capacity (i.e., area-normalized capacity) energy storage devices packed in smaller volumes and areas drives competitive exploration of next generation materials, structures, designs and methods, especially via solid-state microbatteries.

Conventional all-solid-state lithium ion batteries maintain control of performance via standard film encapsulation and packaging techniques (e.g., 2.5D packaging-progressive layering methods). Unfortunately, theoretically high capacity 3D (e.g., manufacturing processes using relatively larger volume components) thin film microbatteries continue to fail commercially due to leakage, dielectric breakdown, 3D fabrication failings, and parasitic cell degradation. Generally, 3D microbattery milestone failures, combined with cost, time of assembly and large active/packaging areas (greater than 1 $mm^2$) of 2.5D form factors, limit the commercial practicality of current microbattery demand in an ever-shrinking foot print market. The demand for microelectronic integrated silicon based all solid-state microbatteries, which require far less space, mass and packaging and function at high performance, is present in the electronic world, with consumer necessity progressively increasing.

SUMMARY

A three dimensional (3D) In-Silicon energy storage device is provided by a method that includes forming a thick dielectric material layer on a surface of a silicon based substrate. A 3D trench is then formed into the dielectric material layer and the silicon based substrate, and thereafter a dielectric material spacer is formed, in addition to the dielectric remaining on the field of the substrate, as well as along a sidewall of the 3D trench, and on a first portion of a sub-surface of the silicon based substrate that is present at a bottom of the 3D trench. A second portion of the sub-surface of the silicon based substrate that is present in the 3D trench remains physically exposed. Active energy storage device materials can then be formed laterally adjacent to the dielectric material spacer that is within the 3D trench and on the dielectric material layer—enabling patterned, isolated control of microbattery arrays within a silicon substrate and forming a silicon-encapsulated "In-Silicon" energy storage device.

The method of the present application provides a 3D In-Silicon energy storage device that has enhanced and consistent performance. The method of the present application is simple, cost efficient, includes a far lower number of processing steps as compared to prior art methods, and illustrates significantly higher energy storage device performance compared with the same In-Silicon energy storage devices which do not have the thick dielectric material patterning illustrated in the present application. Little or no insulation-dependent leakage or short circuiting of the 3D In-Silicon energy storage device of the present application is observed, as the relatively thick dielectric insulation of the 3D patterned devices enables robust insulation structures which hold up to processing, materials integration, depositions, and high electrochemical cycle life.

In one aspect of the present application, a method of forming a 3D In-Silicon energy storage device is provided. In one embodiment, the method includes forming a dielectric material layer having a thickness of greater than 1 μm on a surface of a silicon based substrate. At least one 3D trench is then formed into the dielectric material layer and the silicon based substrate, wherein the at least one 3D trench physically exposes a sub-surface of the silicon based substrate. Next, a dielectric material spacer is formed along a sidewall of the at least one 3D trench and on a first portion of the sub-surface of the silicon based substrate, wherein a second portion of the sub-surface of the silicon based substrate remains physically exposed. Active energy storage device materials can then be formed laterally adjacent to the dielectric material spacer that is within the 3D trench and on the dielectric material layer—enabling patterned, isolated control of microbattery arrays within a silicon substrate. In accordance with the present application, one of the active energy storage device materials is in direct physical contact with the second portion of the sub-surface of the silicon based substrate.

In another aspect of the present application, a 3D In-Silicon energy storage device is provided. In one embodiment, the 3D In-Silicon energy storage device includes a silicon-containing housing structure including at least one 3D trench present in a dielectric material layer and a silicon based substrate, and a dielectric material spacer present in the at least one 3D trench and located on a sidewall of both the dielectric material layer and the silicon based substrate, wherein the dielectric material spacer has a surface that contacts a first portion of a sub-surface of the silicon based substrate, and the dielectric material layer has a thickness of greater than 0.40 µm. Active energy storage device materials are located laterally adjacent to the dielectric material spacer that is present in the at least one 3D trench and on the dielectric material layer, wherein one of the active energy storage device materials is in direct physical contact with a second portion of the sub-surface of the silicon based substrate.

DETAILED DESCRIPTION

Figure 1:
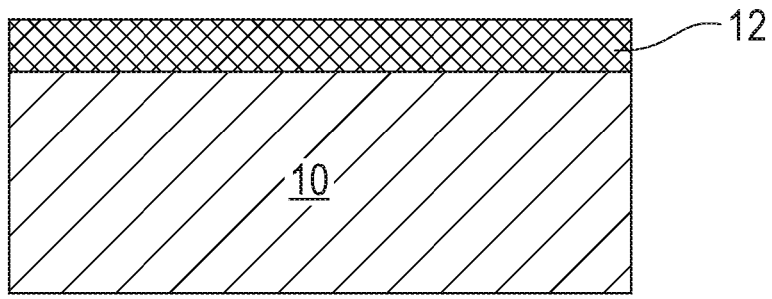
FIG. 1 is a cross sectional view of an exemplary semiconductor structure including a dielectric material layer located on a surface of a silicon based substrate that can be employed in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated an exemplary semiconductor structure including a dielectric material layer 12 located on a surface of a silicon based substrate 10 that can be employed in accordance with an embodiment of the present application. The dielectric material layer 12, which is present on the entirety of the silicon based substrate 10, has a surface that forms an interface with a topmost surface of the silicon based substrate 10. The silicon based substrate 10 can serve as a silicon based electrode, as well as a part of a housing structure for a 3D In-Silicon energy storage device.

In accordance with the present application, the silicon based substrate 10 is composed of a silicon-containing material. The term "silicon-containing material" is used throughout the present application to denote a material that includes at least silicon and has semiconductor material properties. Examples of silicon-containing materials that can be employed as the silicon based substrate 10 include crystalline silicon (Si), a silicon germanium alloy, a p-type doped silicon, boron doped silicon or a carbon-doped silicon based alloy. Typically, the silicon based substrate 10 is composed entirely of crystalline silicon (Si) or boron doped silicon (~1E19).

The silicon-containing materials that provide the silicon based substrate 10 can be non-crystalline semiconductor materials or crystalline semiconductor materials. The silicon based substrate 10 may be entirely non-porous, entirely porous or contain some regions that are non-porous and other regions that are porous. The silicon containing materials may be non-doped, doped or contain some regions that are doped and other regions that are non-doped. The dopant can be a p-type dopant or an n-type dopant.

The term "p-type" refers to the addition of impurities to an intrinsic semiconductor that creates deficiencies of valence electrons. In a silicon-containing semiconductor material, examples of p-type dopants, i.e., impurities, include, but are not limited to, boron, aluminum, gallium and indium. The concentration of p-type dopant within the silicon-containing material that provides silicon based substrate 10 can range from 1E16 atoms/cm$^3$ to 3E20 atoms/cm$^3$.

The term "n-type" refers to the addition of impurities that contributes free electrons to an intrinsic semiconductor. In a silicon containing semiconductor material, examples of n-type dopants, i.e., impurities, include, but are not limited to, antimony, arsenic and phosphorous. The concentration of n-type dopant within the silicon-containing material that provides silicon based substrate 10 can range from 1E16 atoms/cm$^3$ to 1E21 atoms/cm$^3$.

Illustrative examples of silicon-containing materials that can used as the silicon based substrate 10 include non-porous silicon, partially porous crystalline silicon, single-crystal non-porous silicon, crystalline silicon, a low resistance doped crystalline silicon (to be defined herein below), boron doped crystalline silicon or boron doped crystalline porous silicon. In one embodiment, boron doped crystalline silicon having a boron dopant concentration of from 1E19 atoms/cm$^3$ to 3E20 atoms/cm$^3$ is used as the silicon-containing material that provides the silicon based substrate 10.

The term "low resistance doped crystalline silicon" denotes a silicon based substrate 10 that is of unitary construction (i.e., a monolith structure) and includes a non-porous region and a porous region, as defined in U.S. Ser. No. 16/026,461 entitled "Battery Structure with an Anode Structure Containing a Porous Region and Method of Operation", filed on Jul. 3, 2018, the entire content and disclosure of which is incorporated herein by reference.

In embodiments in which a low resistance doped crystalline silicon is used as the silicon based substrate 10, the silicon based substrate 10 includes a top porous layer (Porous Region 1) having a first thickness and a first porosity, and a bottom porous layer (Porous Region 2) having a second thickness that is greater than the first thickness, and a second porosity that is greater than the first porosity. The bottom porous layer (Porous Region 2) is located beneath the top porous layer (Porous Region 1) and forms an interface with a non-porous region. Such a silicon based substrate 10 is shown for example in FIG. 2. In such an embodiment, at least an upper portion of the non-porous region and the entirety of the porous region (including Porous Regions 1 and 2) are composed of silicon. The non-porous region and the porous region (including Porous Regions 1 and 2) are of unitary construction.

Porous Region 1 has a first porosity and a first thickness, and Porous Region 2 has a second porosity and a second thickness. In order to accommodate volume changes during charging and discharging, the porous region (including Porous Region 1 and Porous Region 2) is engineered such that the second porosity and second thickness are greater than the first porosity and first thickness, respectively. In one embodiment, the second porosity has an average pore opening of greater than 3 nm, and the second thickness is between 0.1 µm to 20 µm, while the first porosity has an average pore opening of less than 3 nm, and the first thickness is 50 nm or less.

In the present application, the porosity can be a measure of the volume percentage of the pores (void region in the silicon) divided by the total volume of the porous region (including porous Region 1 and porous Region 2). The porosity may be measured using techniques well known to those skilled in the art including, for example, SEM, RBS, X-ray Diffraction (XRD), Nuclear Magnetic Resonance (NMR), Raman Spectroscopy, gas-on-solid adsorption (porosimetry), mercury space filling porosimetry, density functional theory (DFT), or Brunauer-Emmett-Teller (BET).

In some embodiments, a porous region that has a porosity that is 30% or greater is avoided, which as in the prior art, has a tendency to be brittle and may crack during use such that battery failure may occur. Without wishing to be bound by any theory, it is speculated that the porous region has a porosity such that a sufficient open space within the porous region exists to accommodate volume expansion (i.e., swelling) and/or deformation of both Porous Region 1 (i.e., the top porous layer) and to a lesser extent Porous Region 2 (i.e., the bottom porous layer).

Porous Region 2 can have a compressive stress from 0.02 percent to 0.035 percent. Compressive stress can be determined by X-ray Diffraction or other optical or spectroscopic techniques.

Figure 2:
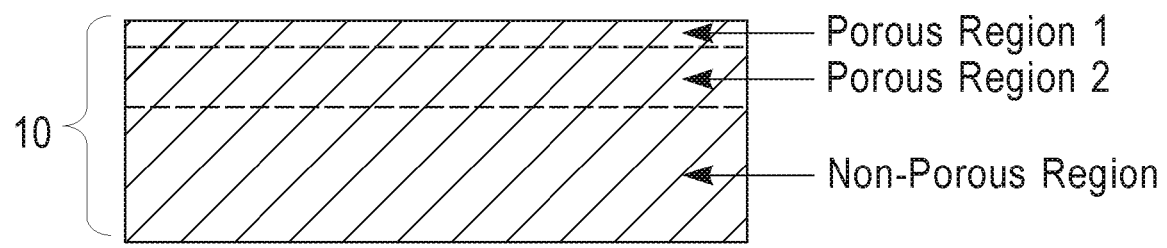
FIG. 2 is an exemplary silicon based substrate that can be employed in one embodiment of the present application that includes Porous Region 1, Porous Region 2 and a non-porous region.

As mentioned above, Porous Region 1, Porous Region 2 and the non-porous region of the silicon based substrate 10 shown in FIG. 2 are of unitary construction. Thus, non-porous region and porous region (including Porous Region 1 and Porous Region 2) are electrically, chemically and mechanically part of a same structure. In some embodiments, the Porous Region 1, Porous Region 2 and the non-porous region are entirely composed of silicon. In this embodiment, the silicon based substrate 10 is created by efficient method steps. In addition, and in embodiments in which the silicon based substrate 10 of FIG. 2 is made of the same semiconductor material (i.e., Si), there are no mechanical stresses or additional electrical resistances within the silicon based substrate 10 of FIG. 2 that might be caused by interfaces between dissimilar materials. In one example, the silicon based substrate 10 including the non-porous region and the porous region (including Porous Region 1 and Porous Region 2) has a three-dimensional (3D) lattice framework composed of a p-type crystalline silicon material.

In some embodiments, at least an upper portion of the non-porous region of the silicon based substrate 10 that forms an interface with Porous Region 2 as well as the entire porous region (including Porous Region 1 and Porous Region 2) are composed of a same material such as, for example, p-type doped silicon material, while a lower portion of the non-porous region may be composed of a different semiconductor material than the upper portion of the non-porous region that forms an interface with Porous Region 2. For example, the lower portion of the non-porous region that is present beneath Porous Region 2 includes doped silicon having a different dopant concentration than the original p-type doped silicon used to provide the silicon base substrate 10 shown in FIG. 2, or a silicon germanium alloy containing less than 10 atomic percent germanium.

In some embodiments and due to the simplicity and manufacturability of single crystalline material, the silicon material that provides at least an upper portion of the non-porous region of that forms an interface with Porous Region 2 as well as the entire porous region (including Porous Region 1 and Porous Region 2) is single crystalline. In some embodiments, the cost of the process can be reduced and controlled by using lower grade silicon and by adjusting the silicon thickness and simplified crystal growth techniques (as is the case observed in the solar industry).

The silicon based substrate 10 of FIG. 2 can be formed by an anodization process. In one embodiment, the anodization process is performed utilizing a constant current source that operates at a current density from 0.05 mA/cm$^2$ to 150 mA/cm$^2$, wherein mA is milli-Amperes. In some examples, the current density is 1 mA/cm$^2$, 2 mA/cm$^2$, 5 mA/cm$^2$, 50 mA/cm$^2$, or 100 mA/cm$^2$. In a preferred embodiment, the current density is from 1 mA/cm$^2$ to 10 mA/cm$^2$. The current density may be applied for 1 second to 5 hrs. In some examples, the current density may be applied for 5 seconds, 30 seconds, 20 minutes, 1 hour, or 3 hours. In an embodiment, the current density may be applied for 10 seconds to 1200 seconds, specifically for the doping level in the range $10^{19}$ cm$^3$ range. The anodization process is typically performed at nominal room temperature from (20° C. to 30° C.)

or at a temperature that is slightly elevated from room temperature. Following the anodization process, the structure is typically rinsed with deionized water and then dried.

In some embodiments of the present application, the silicon based substrate 10 can be subjected to a pre-lithiation treatment process in order to create a highly sustainable pre-lithiated silicon based substrate for long-term rechargeable use. In such an embodiment, lithium metal covers, and is absorbed in, the topmost surface of the silicon based substrate. In some embodiments, the lithium metal can have a thickness that is equal to, or greater than 10 nm. The pre-lithiation treatment process can include an electrochemical lithiation process or a molten lithium application. Molten lithium application includes depositing a layer of a lithium containing salt on a surface of a silicon based substrate; heating the layer of the lithium containing salt to a temperature that provides a molten lithium containing salt; and cooling the molten lithium containing salt to provide an interfacial additive layer composed of the molten lithium containing salt on the silicon-based substrate 10.

Dielectric material layer 12 is composed of any dielectric hard mask material including, for example, a dielectric oxide, or dielectric nitride. Dielectric material stacks can also be used as dielectric material layer 12. In some exemplary examples, the dielectric material layer 12 is composed of silicon dioxide and/or silicon nitride. The dielectric material layer 12 can be formed utilizing a conventional deposition process including, but not limited to, chemical vapor deposition (CVD), plasma enhanced chemical vapor deposition (PECVD), atomic layer deposition (ALD) or physical vapor deposition (PVD). Alternatively, the dielectric material layer 12 can be formed utilizing a thermal growth process including, for example, thermal oxidation or thermal nitridation. The dielectric material layer 12 is a thick layer having a thickness that is greater than 1 micrometers (μm). Such a thickness is essential in the present application to provide optimal protection of the topmost surface of the silicon based substrate 10. In one embodiment of the present application, the dielectric material layer 12 has a thickness from 1 μm to 5 μm.

Figure 3:
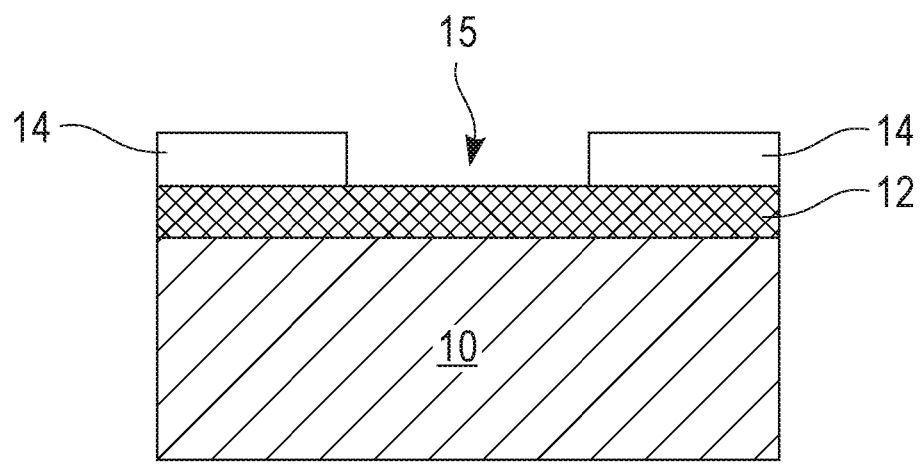
FIG. 3 is a cross sectional view of the exemplary semiconductor structure of FIG. 1 after forming a patterned photoresist on a surface of the dielectric material layer, wherein the patterned photoresist contains at least one opening that physically exposes the dielectric material layer.

Referring now to FIG. 3, there is illustrated the exemplary semiconductor structure of FIG. 1 after forming a patterned photoresist 14 on a surface of the dielectric material layer 12, the patterned photoresist 14 contains at least one opening 15 that physically exposes the dielectric material layer 12. The at least one opening 15 that is present in the patterned photoresist 14 defines a 3D trench pattern which will be subsequently transferred into both the dielectric material layer 12 and the silicon based substrate 10.

Although the present application describes and illustrates that the patterned photoresist 14 has a single opening 15, the present application contemplates embodiments in which more than one opening 15 is present in the patterned photoresist 14. Each opening 15 will be used to provide a 3D trench pattern to both the dielectric material layer 12 and the silicon based substrate 10. Each opening 15 can have a width from 250 microns to 10 millimeters, and a length from 250 microns to 10 millimeters.

The patterned photoresist 14 can be formed utilizing photolithography. Photolithography includes forming a photoresist material (not shown) atop a material or material stack to be patterned (i.e., the material stack of the dielectric material layer 12 and the silicon based substrate 10), exposing the photoresist material to a desired pattern of irradiation and developing the exposed photoresist material utilizing a conventional resist developer. The photoresist material used to provide the patterned photoresist 14 can be a positive-tone photoresist material, a negative-tone photoresist material or a hybrid-tone photoresist material. The photoresist material can be formed utilizing a deposition process such as, for example, spin-on coating.

Figure 4:
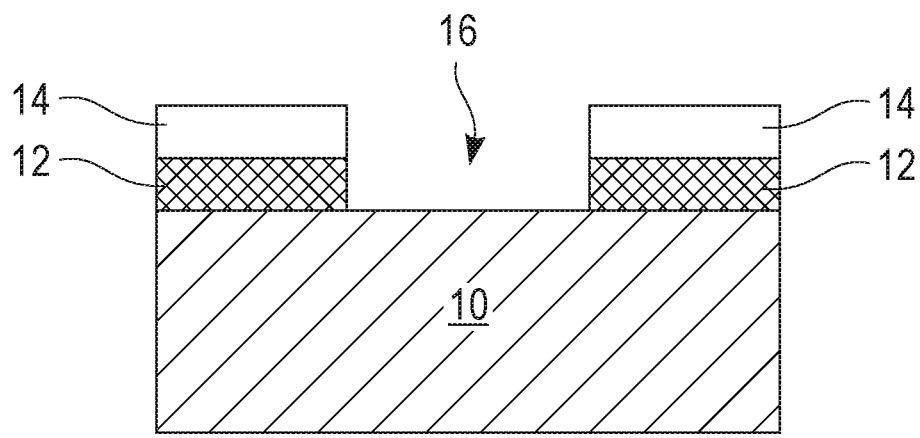
FIG. 4 is a cross sectional view of the exemplary semiconductor structure of FIG. 3 after transferring a 3D trench pattern provided by the at least one opening present in the patterned photoresist into the dielectric material layer.

Referring now to FIG. 4, there is illustrated the exemplary semiconductor structure of FIG. 3 after transferring a 3D trench pattern provided by the at least one opening 15 present in the patterned photoresist 14 into the dielectric material layer 12 so as to form a 3D trench 16 in the dielectric material layer 12. This transferring step stops on a topmost surface of the silicon based substrate 10. The 3D trench 16 that is formed into the dielectric material layer 12 has a width and length that is substantially the same (i.e., within ±10%) as the width and length of opening 15 that is present in patterned photoresist 14.

The transferring of the 3D trench pattern into the dielectric material layer 12 includes an etching process (i.e., wet etch or dry etch) that is selective in removing dielectric material as compared to a semiconductor material. In one embodiment and when the dielectric material layer 12 is composed of silicon dioxide or silicon nitride and the silicon based substrate 10 is composed entirely of silicon, the etching process that is used to transfer the 3D trench pattern into the dielectric material layer 12 includes a dry etch such as reactive ion etch (RIE) utilizing a reactive plasma of $CF_4$, $SF_6$ or $NF_3$.

Figure 5:
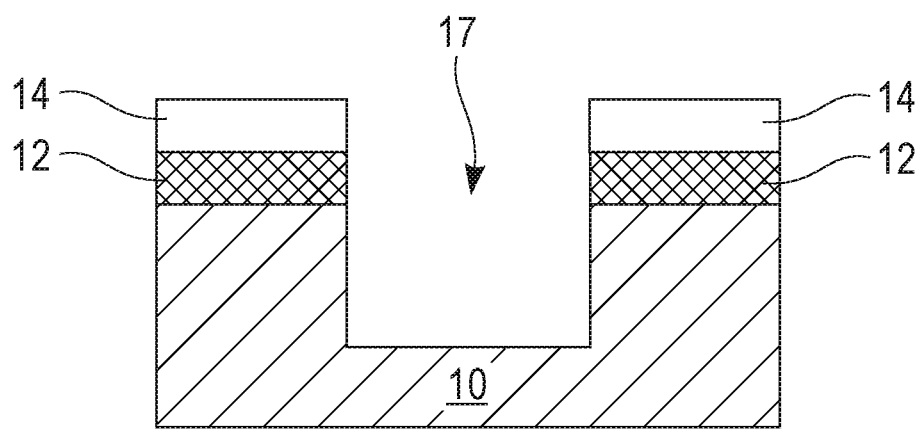
FIG. 5 is a cross sectional view of the exemplary semiconductor structure of FIG. 4 after transferring the 3D trench pattern provided in the dielectric material layer into the silicon based substrate.

Referring now to FIG. 5, there is illustrated the exemplary semiconductor structure of FIG. 4 after transferring the 3D trench pattern in the dielectric material layer 12 into the silicon based substrate 10. This transferring step provides 3D trench 17 which is present in both the dielectric material layer 12 and the silicon based substrate 10. In some embodiments, the opening of the dielectric material layer 12 and formation of the 3D into the silicon based substrate 10 can be formed in a single pattern transfer step.

The 3D trench 17 has a bottom wall that physically exposes a sub-surface of the silicon based substrate 10; the term "sub-surface" is used in the present application to denote a surface of a material that is located between a topmost surface of the material and a bottommost surface of the material. The 3D trench 17 has a width and length that is substantially equal (i.e., within ±10%) to the width and length of both the trench 16 and opening 15. The 3D trench 17 can have a depth, as measured from the topmost surface of the dielectric material layer 12 to a physically exposed sub-surface of the silicon based substrate 10, of from 10 microns to more than 450 microns. In embodiments in which the silicon based substrate 10 shown in FIG. 2 is used, the 3D trench 17 can extend into 400 microns of such a porous silicon based substrate.

The transferring of the 3D trench pattern from the dielectric material layer 12 into the silicon based substrate 10 includes an etching process (i.e., wet etch or dry etch) that is selective in removing semiconductor material as compared to a dielectric material. In one embodiment and when the dielectric material layer 12 is composed of silicon dioxide and the silicon based substrate 10 is composed entirely of silicon, the etching process that is used to transfer the 3D trench pattern from the dielectric material layer 12 into the silicon based substrate 10 includes a wet etch utilizing potassium hydroxide, ethylenediamine pyrocatechol, or tetramethylammonium hydroxide as a chemical etchant. In another embodiment and when the dielectric material layer 12 is composed of silicon dioxide and the silicon based substrate 10 is composed entirely of silicon, the etching process that is used to transfer the 3D trench pattern from the dielectric material layer 12 into the silicon based substrate 10 includes a dry etch such as a reactive ion etch (RIE) utilizing a reactive plasma of $CF_4$, $SF_6$, $NF_3$, $Cl_2$ or $CCl_2F_2$.

In some embodiments of the present application, the physically exposed sub-surface of the silicon based substrate 10 can be subjected to a pre-lithiation treatment process as defined above.

Figure 6:
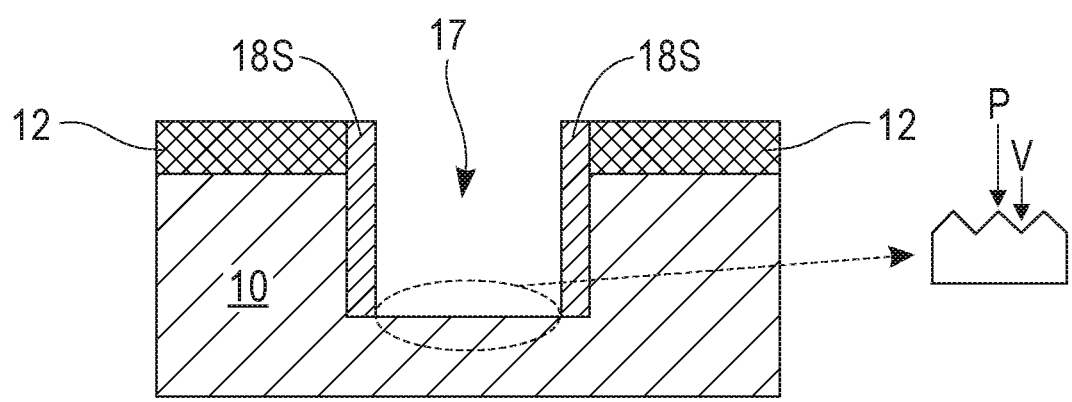
FIG. 6 is a cross sectional view of the exemplary semiconductor structure of FIG. 5 after removing the patterned photoresist, and forming a dielectric material spacer along a sidewall of a 3D trench and the base of the trench, followed by a maskless etching of the dielectric material at the base of the trench and 3D texturing of the trench base.

Referring now to FIG. 6, there is illustrated the exemplary semiconductor structure of FIG. 5 after removing the patterned photoresist 14, and forming a dielectric material spacer 18S along the sidewall and the base of the 3D trench 17, followed by a maskless etching of the dielectric material at the base of the 3D trench 17. The patterned photoresist 14 can be removed utilizing any conventional resist removal process such as, for example, ashing. It is noted that dielectric material remains on the field of the exemplary structure during this step of the present application.

Dielectric material spacer 18S can be formed by first forming a spacer dielectric material layer (not shown) on a topmost surface of the dielectric material layer 12, and continuously within the 3D trench 17 (i.e., along the sidewall of the 3D trench 17 and along the bottom wall of the 3D trench 17, the bottom wall of the 3D trench 17 is defined by the physically exposed sub-surface of silicon based substrate 10). The spacer dielectric material layer may be composed of a same dielectric material as, or a different dielectric material than, the dielectric material that provides the dielectric material layer 12. When the spacer dielectric material layer is composed of a different dielectric material than dielectric material layer 12, the dielectric material that provides the spacer dielectric material layer must have good adhesion to the dielectric material layer 12.

The spacer dielectric material layer can be formed utilizing a deposition process such as, for example, chemical vapor deposition (CVD), plasma enhanced chemical vapor deposition (PECVD), atomic layer deposition (ALD) or physical vapor deposition (PVD). Alternatively, the spacer dielectric material layer can be formed utilizing a thermal growth process including, for example, thermal oxidation or thermal nitridation. The spacer dielectric material layer can have a thickness from 50 nm to 500 nm; other thicknesses are possible as long as the thickness of the spacer dielectric material layer within the 3D trench 17 does not completely fill in the 3D trench 17 leaving adequate volume for formation of active energy storage device materials. In some embodiments, the spacer dielectric material layer is a conformal layer. By 'conformal' layer, it is meant that a material has a same thickness along a horizontal surface of another material as along a vertical surface of the another material.

After forming the spacer dielectric material layer, the spacer dielectric material layer is removed from all horizontal surfaces of the structure including the topmost surface of the dielectric material layer 12, and the bottom of 3D trench 17, while maintaining the spacer dielectric material layer on the sidewall of the 3D trench 17. Although not specifically illustrated in the drawings, the thickness of the dielectric material layer 12 can be reduced during this step of the present application. The maintained spacer dielectric material layer that is located on the sidewall of the 3D trench 17 provides dielectric material spacer 18S. Dielectric material spacer 18S can have a topmost surface that is coplanar with a topmost surface of the dielectric material layer 12. In some embodiments, the dielectric material spacer 18S has a topmost surface that can be located between a topmost surface and a bottommost surface of the dielectric material layer 12.

In addition to being present along the sidewall of the 3D trench 17, the dielectric material spacer 18S has a surface that is located on a first portion of the sub-surface of the silicon based substrate 10 that is present at the bottom of 3D trench 17. As is shown in FIG. 6, a second portion of the sub-surface of the silicon based substrate 10 located at the bottom of the 3D trench 17, which is laterally adjacent the first portion, is physically exposed.

In some embodiments, the removal of the spacer dielectric material layer from the topmost field area surface 14 of the structure including also some of the originally grown or deposited dielectric material layer 12, and the bottom of 3D trench 17 includes a mask-less reactive ion etch process. In this embodiment, all of the dielectric material residing on the sub-surface at the base of the trench 17 as well as only some of the dielectric material on the top most field surface 12, 14 is removed during the mask-less RIE process—yielding a substrate with thick dielectric on the topmost field surface and vertical sidewalls, but no dielectric material on the sub-surface at the base of the 3D trench 17.

In other embodiments, the removal of the spacer dielectric material layer from only the sub-surface of the 3D trench 17 includes the use of laser ablation. Laser ablation includes irradiating the structure including the spacer dielectric material layer with a laser beam. In the present application, the laser ablation can be performed using a laser flux with laser pulse applications less than, or equal to, nanoseconds and laser power as high as $10^{13}$ W/cm$^2$. The laser ablation can be performed in a pulsed mode or a continuous mode and in a raster type pattern.

When laser ablation is employed, the second portion of the sub-surface of the silicon based substrate 10 that is physically exposed at the bottom of 3D trench 17 (and not covered by the dielectric material spacer 18S) is roughened (i.e., textured). This textured surface can increase the surface area of the physically exposed semiconductor material at the bottom of trench 17 and therefore increase the charge storage energy and power density of the energy storage device in the present application. The increased surface area can in turn increase the performance of the 3D In-Silicon energy storage device. The textured surface of the second portion of the sub-surface of the silicon based substrate 10 is shown, for example, in the inset of FIG. 6. The textured surface of the silicon based substrate 10 that is physically exposed at the bottom of 3D trench 17 can include a plurality of peaks, P, and valleys, V, wherein each valley, V, is located between a neighboring pair of peaks P. The textured surface may by pyramidal shaped, as is shown in the inset of FIG. 6. In other embodiments, the textured surface can be dome shaped or trapezoidal in shape, with many other shape structures possible. In other embodiments, laser ablation can also be utilized to texture the sub-surface of the 3D trench 17 after the above described mask-less RIE process has been applied.

When laser ablation is employed, contaminant particles as well as a thin dielectric oxide material can form on the 3D textured sub-surface at the bottom of 3D trench 17. The contaminant particles and thin dielectric oxide are removed before further processing using dilute hydrofluoric acid or any other etchant that is capable of removing the contaminant particles and thin dielectric oxide from the bottom of the 3D trench 17.

The second portion of the sub-surface of the semiconductor substrate 10 at the bottom of the 3D trench 17 can have a textured surface or a non-textured surface The term "non-textured surface" denotes a surface that is smooth and has a surface roughness on the order of less than 100 nm root mean square as measured by profilometry or Atomic Force Microscopy. The term "textured surface" denotes a surface that has a roughness in a range from 100 nm root mean square to 100 µm root mean square as also measured by profilometry or Atomic Force Microscopy.

In some embodiments, and of the present application, the physically exposed textured sub-surface of the silicon based substrate 10 can be subjected to a pre-lithiation treatment process, as defined above.

FIG. 6 shows a silicon-containing housing structure which can be used as a component of a 3D In-Silicon energy storage device. The silicon-containing housing structure includes at least one 3D trench 17 present in a dielectric material layer 12 and a silicon based substrate 10, and a dielectric material spacer 18S present in the at least one 3D trench 17 and located on a sidewall of both the dielectric material layer 12 and the silicon based substrate 10, wherein the dielectric material spacer 18S has a surface that contacts a first portion of a sub-surface of the silicon based substrate 10 at the bottom of the at least one 3D trench 17, and the dielectric material layer 12 has a thickness of greater than 0.4 µm, however other final thicknesses are possible depending on conditions used, in its final form after sub-surface dielectric removal and contamination removal; the thickness of dielectric material layer 12 is still sufficient to provide the necessary insulation to the structure. In the silicon-containing housing structure shown in FIG. 6, a second portion of the sub-surface of the silicon based substrate 10 is physically exposed at this point of the present application. The presence of the dielectric material layer 12 and dielectric spacer 18S provide adequate electrical and ion isolation to the structure while being utilized as an electrochemical charge storage and transfer device.

Figure 7:
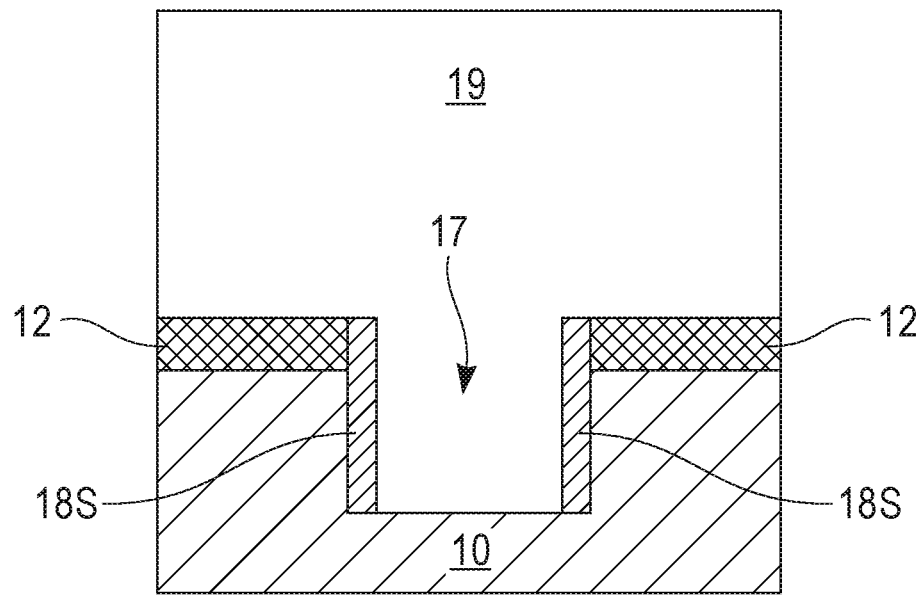
FIG. 7 is a cross sectional view of the exemplary semiconductor structure of FIG. 6 after forming active energy storage device materials into the remaining portion of the 3D trench and atop the dielectric material layer.

As is shown in FIG. 7, active energy storage device materials (collectively labeled as element 19 in FIG. 7) can now be formed laterally adjacent to the dielectric material spacer 18S that is present in the at least one 3D trench 17 and on the dielectric material layer 12. In the present application, one of the active energy storage device materials is in direct physical contact with the second portion of the sub-surface of the silicon based substrate 10 that is located laterally adjacent the first portion and present at the bottom of the at least one 3D trench 17. In the present application, the silicon based substrate 10 can serve as an anode current collector of an energy storage device.

In some embodiments, the active energy storage device materials are constituents of an all solid-state microbattery. In such an embodiment, the microbattery uses solid electrodes and a solid electrolyte, instead of liquid or polymer gel electrolytes. The active energy storage device materials of an all solid-state microbattery typically include an optional anode material as known to one skilled in the art, a solid electrolyte (either polymer based or an inorganic material) as known to one skilled in the art, a cathode material as known to one skilled in the art, and a cathode current collector as known to one skilled in the art.

In one embodiment, the all solid-state microbattery is a lithium-ion battery that includes an optional anode material in contact with the silicon at the 3D trench sub-surface, a solid electrolyte (either polymer based or an inorganic material), a cathode material, and a cathode current collector.

When present, the anode material of a lithium-ion battery can include lithium metal, a lithium-based alloy such as, for example, $Li_xSi_y$, or a lithium-based mixed oxide such as, for example, lithium titanium oxide ($Li_2TiO_3$). The anode material of a lithium-ion battery may also be composed of Si, graphite, amorphous carbon or a conductive composite material (e.g., carbon materials formulated with a conductive polymer and binder materials). In one specific embodiment the anode material is graphite material is a mixture with binder (e.g., polyvinylidene fluoride (PVDF)) material and conductive enhancing agents (e.g., carbon black) and solvent (e.g., N-methyl-2-pyrrolidone (NMP)). In another embodiment the anode material is a composite of graphite material with binder material, conductive enhancing agents and a solid polymer electrolyte.

The anode material of a lithium-ion battery can be formed utilizing a deposition process such as, for example, chemical vapor deposition (CVD), plasma enhanced chemical vapor deposition (PECVD), evaporation, sputtering, plating, slurry casting, slurry doctor blading, injection mold pressing, spin coating or any combinations of the presented deposition processes. In some embodiments, the anode material is not formed during the formation of the active energy storage device materials of the lithium-ion battery. In such an embodiment, a lithium accumulation region, which serves as an anode material, is formed during lithiation of the silicon sub-surface. In another embodiment, the anode material (e.g., graphite) deposited during the formation of the active energy storage device which is in contact with the textured or non-textured silicon based sub-surface, acts as both an anode material for the charge hosting of lithium materials as well as a conductive medium which facilitates the formation of lithium metal formation on the silicon sub-surface, as well as for lithiation into the silicon substrate bulk, during lithiation of the combined anode and silicon sub-surface. The anode material of a lithium-ion battery can have a thickness from 20 nm to 400 µm.

As mentioned above, the solid electrolyte of a lithium-ion battery can be a polymer based material or an inorganic material. In one preferred embodiment, a polymer based material can include a solid polymer electrolyte, such as a mixture of polycaprolactone, succinonitrile and lithium bis (trifluoromethanesulfonyl)imide. In other embodiments, the solid-state electrolyte of a lithium-ion battery includes a material that enables the conduction of lithium ions. Such materials may be electrically insulating and ionic conducting. Examples of materials that can be employed as the solid-state electrolyte include, but are not limited to, lithium phosphorus oxynitride (LiPON) or lithium phosphosilicate oxynitride (LiSiPON), thio-LiSiCoN electrolytes (e.g., $Li_2S$—$P_2S_5$ in any ratio), $Li_{10}SnP_2S_{12}$, LiSiCoN-like electrolytes (e.g., $Li_{10}GeP_2S_{12}$), Argyrodite electrolytes (e.g., $Li_6PS_5Br$), Garnet Electrolytes (e.g., $Li_{6.55}La_3Zr_2Ga_{0.15}O_{12}$), NaSiCoN-like electrolytes (e.g., $Li_{1.3}Al_{0.3}Ti_{1.7}(PO_4)_3$), Li-Nitride electrolytes (e.g., $Li_3N$), Li-Hydride Electrolytes (e.g., $Li_2NH$), or Pervoskite Electrolytes (e.g., $Li_{0.34}La_{0.51}TiO_{2.94}$).

The solid-state electrolyte of a lithium-ion battery can be formed utilizing a deposition process such as, sputtering, solution deposition, hot pressing, cold pressing, slurry casting, spin coating, drop casting, or spin coating. In one embodiment, the solid-state electrolyte is formed by sputtering utilizing any conventional target source material in conjunction with reactive or inert gasses. For examples, sputtering may be performed in the presence of at least a nitrogen-containing ambient, in forming the LiPON electrolyte. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

In some embodiments, a separator is present between a first solid-state electrolyte region and a second solid-state electrolyte region, for example, when a solid polymer electrolyte is utilized as the electrolyte material. The separator can include one or more of a flexible porous material, or a sheet that is composed of cellulose, cellophane, polyvinyl acetate (PVA), PVA/cellulous blends, polyethylene (PE), polypropylene (PP) or a mixture of PE and PP. In one preferred embodiment, the separator is made from electrospun polyacrylonitrile (PAN). The separator may also be composed of inorganic insulating nano/microparticles. The separator may be formed utilizing techniques well known to those skilled in the art and be electrically insulating yet ionically conducting.

The cathode material of a lithium-ion battery is composed of a lithium-containing material such as, for example, a lithium-based mixed oxide. Examples of lithium-based mixed oxides that may be employed as the lithium-containing cathode material include, but are not limited to, lithium cobalt oxide ($LiCoO_2$), lithium nickel oxide ($LiNiO_2$), lithium manganese oxide ($LiMn_2O_4$), lithium manganese oxyfluoride ($Li_2MnO_2F$), lithium vanadium pentoxide ($LiV_2O_5$), lithium nickel manganese cobalt (NMC), nickel cobalt aluminum oxide (NCA), any combination of sulfur-based materials with lithium and other structure supporting elements such as iron, or lithium iron phosphate ($LiFePO_4$). In one preferred embodiment, the cathode employed is a composite of lithium manganese fluoride, solid polymer electrolyte (which is composed of succinonitrile, polycaprolactone and Lithium bis(trifluoromethanesulfonyl)imide salt), a polyvinylidene fluoride binder, a conductive enhancing carbon based material such as carbon black. The lithium-containing cathode material may have a thickness from 10 nm to 300 μm. Other thicknesses that are lesser than, or greater than, the aforementioned thickness values may also be used for lithium-containing cathode material.

In some embodiments, the lithium-containing cathode material may be formed utilizing a deposition process such as, sputtering, slurry casting or plating. In one embodiment, the lithium-containing cathode material is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof in conjunction with oxygen.

In some embodiments, the lithium-containing cathode material can be formed by slurry casting, which may contain a mixture of electrochemically active [cathode materials, electron-conducting materials (e.g., carbon-based materials)] and inactive (binder materials) components. The thickness of such layers could range from 5 μm to 500 μm. These slurries can also have an electrolyte component in the mixture, along with a lithium based salt(s).

The cathode current collector of a lithium ion battery can be composed of any well known cathode current collector such as, for example, aluminum.

Although the present application describes and illustrates lithium ion batteries, the active energy storage device materials can include constituents of other solid-state batteries that are non-lithium ion based, such as, for example, nickel-cadmium or nickel metal hydride. Also, the active energy storage device materials can include constituents of a supercapacitor, also called an electric double layer capacitor. A supercapacitor is a high-capacity capacitor with a capacitance value much higher than other capacitors, but with lower voltage limits, that bridges the gap between electrolytic capacitors and rechargeable. Supercapacitors use carbon electrodes or derivatives with much higher electrostatic double-layer capacitance than electrochemical pseudocapacitance, achieving separation of charge in a Helmholtz double layer at the interface between the surface of a conductive electrode and an electrolyte. The separation of charge is of the order of a few Angstroms, much smaller than in a conventional capacitor.

Figure 8:
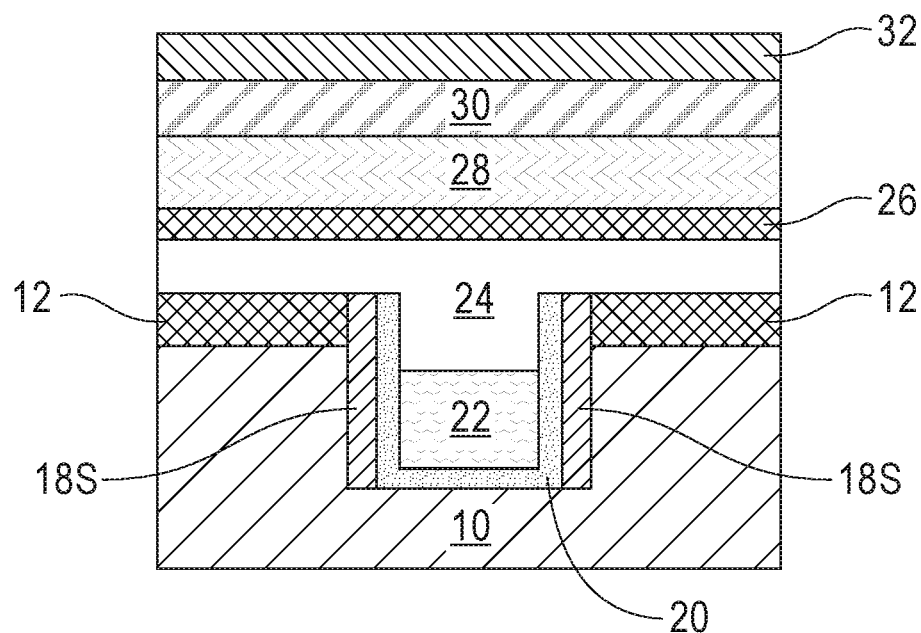
FIG. 8 is a cross sectional view of an exemplary 3D In-Silicon energy storage device of the present application including the silicon-containing housing structure of FIG. 6 and components of a lithium-ion battery.

Referring now to FIG. 8, there is an exemplary 3D In-Silicon energy storage device of the present application including the silicon-containing housing structure of FIG. 6 and components of a lithium-ion battery. Notably, FIG. 8 shows active energy storage device materials (20/22/24/26/28/30/32) of an exemplary Li-ion battery that can be formed laterally adjacent to the dielectric material spacer 18S that is present in the at least one 3D trench 17 and on the dielectric material layer 12, wherein one of the active energy storage device materials (i.e., element 20), is in direct physical contact with the second portion of sub-surface of the silicon based substrate 10.

The active energy storage device materials (20/22/24/26/28/30/32) of the exemplary Li-ion battery include a conductive polymeric adhesion 20 such as, for example, polyaniline (PANI) combined with lithium bis(trifluoromethanesulfonyl)imide (LiTFSI), an anode material 22 composed of a composite of graphite slurry material and LiTFSI-PANI, a first solid polymeric region 24 composed of a mixture of polycaprolactone, succinonitrile and lithium bis(trifluoromethanesulfonyl)imide, a PAN separator 26, a second solid polymeric region 28 composed of a mixture of polycaprolactone, succinonitrile and lithium bis(trifluoromethanesulfonyl)imide, a composite cathode material 30 composed of a mixture of lithium magnesium oxyfluoride, solid polymer electrolyte (composed of a mixture of polycaprolactone, succinonitrile and lithium bis(trifluoromethanesulfonyl)imide), conductive carbon material and PVDF binder material, and a cathode current collector 32. The cathode current collector 32 may be composed of a conventional material such as, for example, aluminum. These materials are exemplary, and the Li-ion battery is not restricted to the same.

Although not illustrated in FIG. 8, a first stainless steel coin cell casing can be located beneath the silicon based substrate 10 and a second first stainless steel coin cell casing can be located above the cathode current collector 32. Additionally, other forms of hermetic sealing and encapsulation are possible, such as insulated coatings (e.g., silicon nitride) or combinations thereof (e.g., silicon nitride/aluminum/silicon nitride/aluminum/silicon nitride).

In some embodiments, the all solid-state microbattery is a lithium-ion battery that includes an optional anode material, a solid electrolyte (either polymer based or an inorganic material), a cathode material, and a cathode current collector, wherein the entire In-Silicon full microbattery is encapsulated in a coin cell type material. In one particular embodiment, the solid-state lithium ion microbattery includes a thick oxide insulation on the field, sidewalls and silicon sub-surface of a 1 $mm^2$ trench structure, where the oxide has been etched away/removed from the silicon sub-surface and 3D textured via laser ablation. A LiTFSI/PANI mixture is applied to the 3D textured silicon sub-surface, followed by a graphite slurry anode, and then a solid polymer electrolyte (SPE) composed of a mixture of polycaprolactone, succinonitrile, LiTFSI-salt with a polyacrylnitrile (PAN) separator sandwiched between connected SPE layers, an 'oversized' composite lithium manganese oxyfluoride (LMOF) and SPE (polycaprolactone, succinonitrile, LiTFSI-salt) containing PVDF and carbon black cathode (>1 mm$^2$) which is connected to an aluminum current collector. This particular In-Silicon energy storage device is encapsulated in a coin cell and tested with current ranges typically in the range between 5.6 V to 0.1 V, with a preferred embodiment where the voltage range is between 4.6 V to 4.9V, and 1V.

Figure 9:
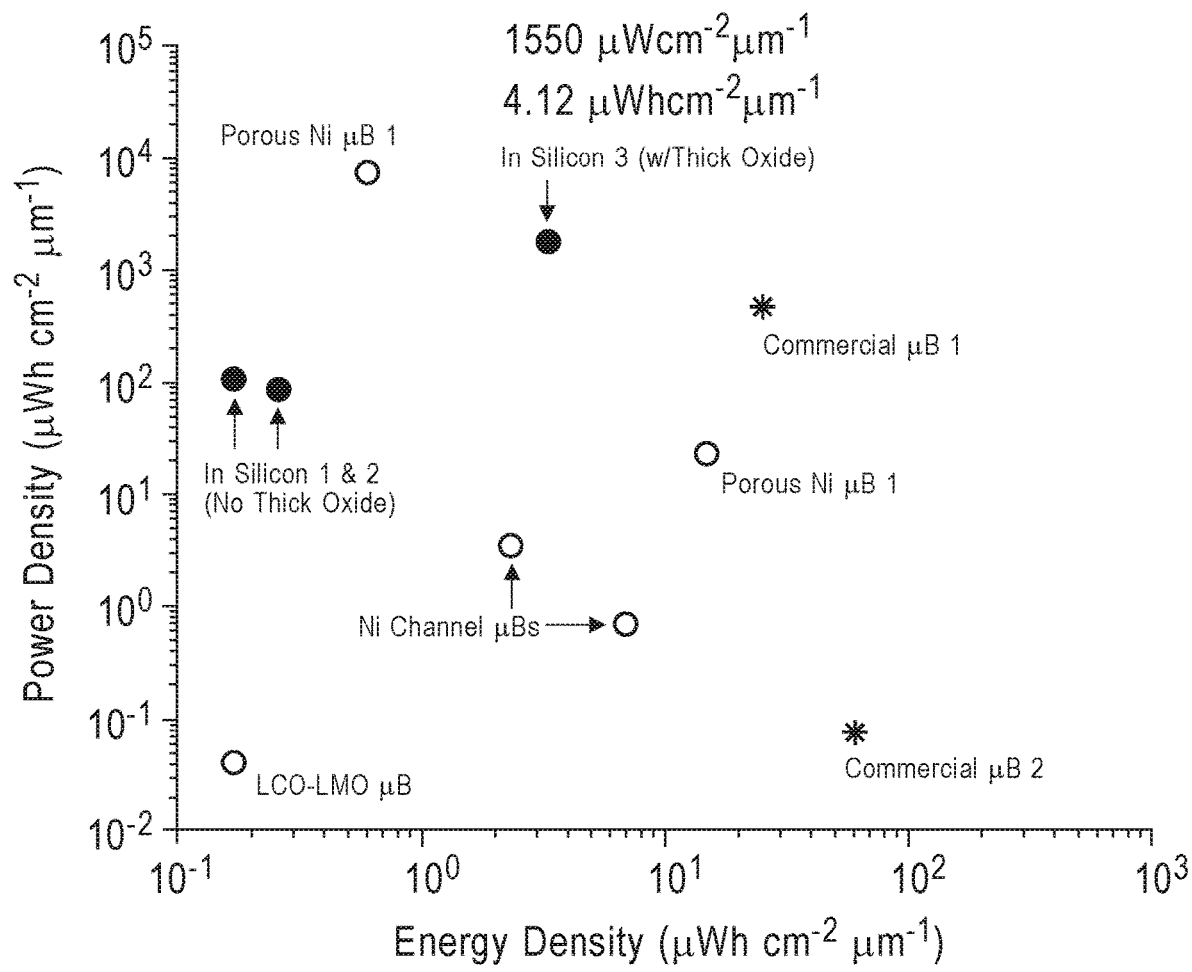
FIG. 9 illustrates a Ragone plot (volumetric energy density vs. volumetric power density) of various microbatteries, one in accordance with the present application, and the others not in accordance with the present application.

FIG. 9 illustrates a Ragone plot (volumetric energy density vs. volumetric power density) for a preferred embodiment with the above described full In-Silicon microbattery formulation (i.e., In-Silicon 3) and two comparative formulations (In-Silicon 1 and 2) which contain a lower capacity/ lower energy dense lithium iron phosphaste (LFP) electrode and do not contain the thick oxide insulation of the present application, nor the full cell formulation described in the paragraph above. The plot also includes commercial microbattery cells (Commercial μB 1 and μB2) which are some of best in league, as well as other microbattery cells, e.g., porous Ni μB 1, Ni Channel μBs, and LCO-LMO μB. The inventive (i.e., In-Silicon 3) microbattery data point in the top right of the plot contains the thick oxide insulation patterning of the present application and it contains the preferred full cell formulation. As is shown, the inventive (i.e., In-Silicon 3) microbattery has a power density of greater than, or equal to, 1500 uA cm$^{-2}$ mm$^{-1}$, and an energy density of greater than, or equal to, 4 uAh cm$^{-2}$ mm$^{-1}$. Thus, inventive (i.e., In-Silicon 3) microbattery exhibits over a 15× increase in volumetric energy density and over an 18× increase in volumetric power density when the preferred full cell embodiments are utilized in combination with the thick oxide insulation patterning method of the present application.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A three dimensional (3D) In-Silicon energy storage device comprising:
    a semiconductor-containing housing structure comprising at least one 3D trench present in a dielectric material layer and a silicon based substrate, and a dielectric material spacer present in the at least one 3D trench and located on a sidewall of both the dielectric material layer and the silicon based substrate, wherein the dielectric material spacer has a surface that contacts a first portion of a sub-surface of the silicon based substrate, and the dielectric material layer has a thickness of greater than 0.40 μm; and
    active energy storage device materials located laterally adjacent to the dielectric material spacer that is present in the at least one 3D trench and on the dielectric material layer, wherein one of the active energy storage device materials is in direct physical contact with a second portion of the sub-surface of the silicon based substrate.

2. The 3D In-Silicon energy storage device of claim 1, wherein the second portion of the sub-surface of the silicon based substrate is non-textured.

3. The 3D In-Silicon energy storage device of claim 1, wherein the second portion of the sub-surface of the silicon based substrate is textured.

4. The 3D In-Silicon energy storage device of claim 1, wherein sub-surface of the silicon based substrate is pre-lithiated to include a layer of lithium metal.

5. The 3D In-Silicon energy storage device of claim 4, wherein the silicon based substrate is composed of non-porous silicon, partially porous crystalline silicon, single-crystal non-porous silicon, crystalline silicon, boron doped crystalline silicon or boron doped crystalline porous silicon.

6. The 3D In-Silicon energy storage device of claim 4, wherein the silicon based substrate is composed of a low resistance doped crystalline silicon that comprises a top porous layer having a first thickness and a first porosity, a bottom porous layer having a second thickness that is greater than the first thickness, and a second porosity that is greater than the first porosity, and a non-porous region that is located beneath, and forms an interface with, the bottom porous layer.

7. The 3D In-Silicon energy storage device of claim 1, wherein the dielectric material layer and the dielectric material spacer are composed of a compositionally same dielectric material.

8. The 3D In-Silicon energy storage device of claim 1, wherein the active energy storage device materials are components of all solid-state lithium ion battery.

9. The 3D In-Silicon energy storage device of claim 8, wherein the lithium ion battery comprises at least a solid-state electrolyte and a cathode material composed of a lithium-containing material; wherein the 3D In-Silicon energy storage device has a volumetric power density of greater than, or equal to, 1500 uW cm$^{-2}$ mm$^{-1}$.

10. The 3D In-Silicon energy storage device of claim 8, wherein the lithium ion battery comprises at least a solid-state electrolyte and a cathode material composed of a lithium-containing material, wherein the 3D In-Silicon energy storage device has a volumetric energy density of greater than, or equal to, 4 uWh cm$^{-2}$ mm$^{-1}$.

* * * * *